UNITED STATES PATENT OFFICE.

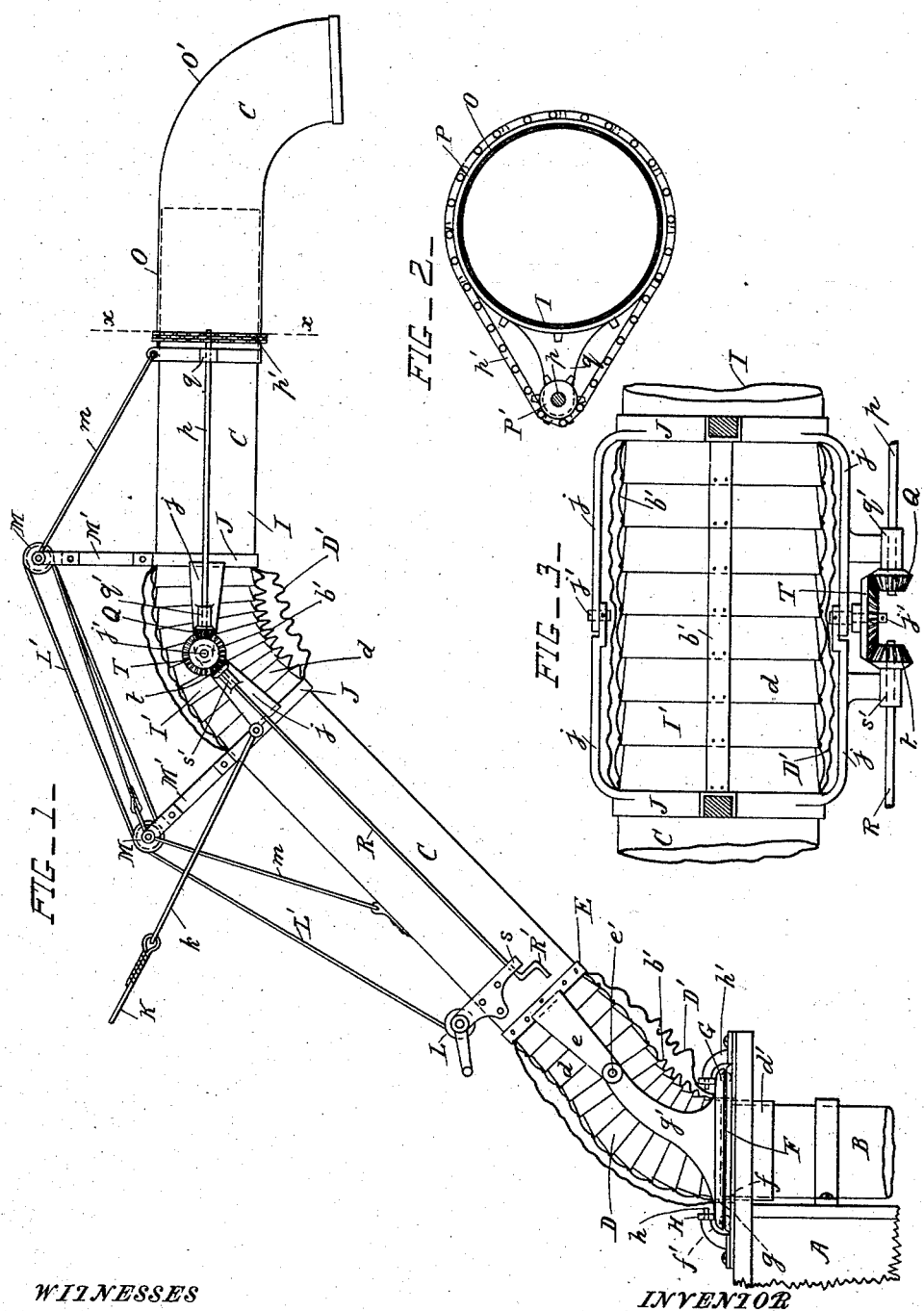

FRANK F. LANDIS, OF WAYNESBOROUGH, PENNSYLVANIA.

STRAW-STACKER.

SPECIFICATION forming part of Letters Patent No. 522,759, dated July 10, 1894.

Application filed January 25, 1894. Serial No. 498,030. (No model.)

*To all whom it may concern:*

Be it known that I, FRANK F. LANDIS, a citizen of the United States, residing at Waynesborough, in the county of Franklin and State of Pennsylvania, have invented certain new and useful Improvements in Straw-Stackers; and I do hereby declare the following to be a full, clear, and exact description of the invention, such as will enable others skilled in the art to which it appertains to make and use the same.

This invention relates to straw stackers used in connection with thrashing machines, and more particularly to pneumatic straw stackers which are used inside barns and in other places where the space for handling the discharge pipe is limited.

This invention consists in the novel construction and combination of the parts hereinafter fully described and claimed.

In the drawings: Figure 1 is a side view of the straw stracker. Fig. 2 is a cross-section through the discharge pipe, taken on the line $x$ $x$ in Fig. 1. Fig. 3 is a plan view of the joint in the discharge pipe, partly in section.

A is a portion of the casing of a grain separator; and B is the delivery pipe through which the straw is driven by a blast of air in any approved manner. The pipe B is secured to the separator casing.

C is the discharge pipe; and D is a flexible junction pipe which connects the pipes B and C, and permits the pipe C to be moved in every direction both vertically and circumferentially.

The pipe D preferably consists of a series of articulated conical segments, connected by three or more leather straps $b'$, and inclosed in a tube D′ of substantially air-tight and flexible material, such as canvas. The upper end of the pipe D is secured to the lower end of the discharge pipe C, and its lower end is provided with a cylindrical end piece $d'$ which is free to revolve upon the upper end of the delivery pipe B. A jointed supporting device is provided to prevent the segments of the pipe D from telescoping under the downward thrust of the discharge pipe.

E is a collar secured to the discharge pipe C and provided with downwardly and rearwardly projecting arms $e$.

F is a bearing plate secured to the separator casing and provided with a hole $f$ for the lower end of the pipe D to pass through.

G is a revoluble plate supported by the bearing plate F, and provided with a hole $g$ for the end of the pipe D to pass through. Arms $g'$ project upwardly from the plate G and are pivoted to the arms $e$ by the pins $e'$. The plate G may bear direct upon the plate F, if desired, and it may be prevented from rising by any approved retaining device, but in order to permit the pipe C to be swung around with as little friction as possible, a series of balls $f'$ is interposed between the two plates, and the plate G is prevented from rising by the antifriction rollers H journaled on the pins $h$ which project from the stationary brackets $h'$. Any other equivalent antifriction devices may be used in place of those described in carrying out this invention, for instance, a ball bearing might be used in place of the rollers, and the plate G might revolve upon rollers.

The discharge pipe C is made of a length adapted to stack the straw to the required height, but in order to adapt the machine for use in parts of the country where most of the grain is thrashed in barns where the space for handling the long discharge pipe is limited, the discharge pipe is made in two or more sections connected by flexible junction pipes.

In the drawings, the discharge pipe is shown made in two sections, and the upper section I is connected to the lower by a flexible junction pipe I′. A collar J is secured on the end of each section, and is provided with side arms $j$ which are pivoted together by the pins $j'$.

The flexible pipe I′ may be of any approved construction, but it preferably consists of a series of articulated conical segments $d$, connected by three or more leather straps $b'$, and inclosed in a tube of substantially air-tight and flexible material, the same as the pipe D. The pivot pins $j'$ are preferably arranged at that point which will permit the bending of the pipe to be as evenly distributed over the segments as possible.

The whole discharge pipe is supported, lifted and lowered by means of any approved form of supporting device, such as the cord K which is attached to the lower section of the pipe by a bail $k$, and a windlass, or other hoisting mechanism of approved construction, not shown in the drawings. The upper section of the discharge pipe is also supported and adjusted by means of any approved device adapted for that purpose. The device shown in the drawings consists of a windlass L supported by the lower section of the pipe, and a cord L'. The cord L' passes over sheaves M journaled in brackets M' which are secured to the respective sections of the pipe. One end of the cord is connected to the windlass, and the other to one of the said brackets. The brackets are provided with stay rods $m$, and the operating device permits the upper section of the discharge pipe to be placed at a right angle to the lower section, if desired.

The discharge pipe C is provided with a revoluble end portion O, journaled on the end of the upper section I, and provided with a deflector O' for changing the direction of the straw as it issues from the end of the discharge pipe. This deflector is shown as a plain bend pipe on the extremity of the end portion O, but it may be a bend pipe made of a series of conical segments, or it may consist of any approved form of deflecting plate attached to the end portion, and it may be adjustable or not, as desired. Means for revolving the end portion O are provided and may be of various approved forms. The means shown in the drawings consist of a chain wheel P secured to the end portion, a chain pinion P' secured on a shaft $p$, and a drive chain $p'$ passing around the said wheel and pinion. The shaft $p$ is journaled in a bearing $q$ secured to the pipe section I, and in a bearing $q'$ on one of the arms $j$, and is provided with means for revolving it, such as the beveled pinion Q. In order that the end portion may be revolved by a man on the top of the separator, irrespective of the position of the sections of the discharge pipe, a shaft R is provided and is furnished with an operating crank R'. The shaft R is journaled in a bearing $s$ secured to the pipe C, and in a bearing $s'$ on one of the arms $j$. The ends of the two shafts $p$ and R are operatively connected together. This may be accomplished by a universal joint or coupling of any approved form, but the use of beveled toothed wheels is preferred.

T is a beveled toothed wheel journaled on the end of one of the pins $j'$, and gearing into the pinion Q; and $t$ is a beveled toothed pinion secured on the end of the shaft R and gearing into the wheel T. When the handle or crank R' is turned, the shafts R and $p$ are revolved and the end portion and the deflector are revolved to the right or left as required.

When the upper section of the discharge pipe is raised to a vertical position, and the end portion and deflector are revolved to point upward, instead of downward as shown in Fig. 1, the straw can be discharged into an overden or compartment of the barn directly over the thrashing machine, and as the flexible junction pipe D permits the discharge pipe to be moved in any direction, the device can be used in almost every kind of barn, and will stack the straw in all its overdens, compartments, and upper floors, and will fill in all its corners.

What I claim is—

1. In a pneumatic straw stacker, the combination, with a stationary delivery pipe, a swinging discharge pipe, and a flexible junction pipe connecting the aforesaid pipes; of a collar provided with downwardly and rearwardly projecting arms and operatively connected with the discharge pipe, and a revoluble supporting plate provided with a hole for the lower end of the junction pipe to pass through and having upwardly and forwardly projecting arms pivoted to the aforesaid arms at the sides of the junction pipes, substantially as set forth.

2. In a pneumatic straw stacker, the combination, with a stationary delivery pipe, a swinging discharge pipe, and a flexible junction pipe; of a stationary bearing plate, a revoluble plate provided with upwardly and forwardly projecting arms, each said plate having a hole for the end of the junction pipe to pass through; and a collar operatively connected with the discharge pipe and provided with downwardly and rearwardly projecting arms pivoted to the aforesaid arms at the sides of the junction pipe, substantially as set forth.

3. In a pneumatic straw stacker, the combination, with the delivery pipe, the discharge pipe, and the flexible junction pipe; of the stationary bearing plate, the revoluble plate provided with upwardly and forwardly projecting arms, antifriction devices interposed between the said plates, retaining devices arranged above the revoluble plate to keep it from rising, and the downwardly and rearwardly projecting arms secured to the discharge pipe and pivoted to the aforesaid arms at the sides of the junction pipe, substantially as set forth.

4. In a pneumatic straw stacker, the combination, with a stationary delivery pipe, and a flexible junction pipe; of a discharge pipe formed in two sections, the lower section being connected to the said junction pipe; and a flexible joint coupling the said sections and consisting of a series of articulated segments, straps connecting the said segments, an inclosing tube of flexible material, and arms secured to the respective sections and having their meeting ends pivoted together at the sides of the said flexible joint, substantially as set forth.

5. In a pneumatic straw stacker, the combination, with a delivery pipe and a flexible junction pipe; of a discharge pipe formed in two sections, the lower section being connected to the said junction pipe, a flexible joint coupling the said sections, arms secured to the respective sections and having their meeting ends pivoted together at the sides of the said flexible joint, and a supporting cord connected to the said lower section, and permitting the upper section to be placed out of line with it, substantially as set forth.

6. In a pneumatic straw stacker, the combination, with a stationary delivery pipe, and a flexible junction pipe; of a swinging discharge pipe connected to the said junction pipe and formed in two sections, a flexible joint coupling the said sections, pivoted arms secured to the sections and preventing the joint from telescoping, means for adjusting the position of the upper section, and a revoluble end portion provided with a deflector and carried by the said discharge pipe, substantially as set forth.

7. In a pneumatic straw stacker, the combination, with a swinging non-revoluble discharge pipe formed of two sections, and a joint coupling the sections and permitting the upper section to be placed at an angle to the lower section, of a revoluble end portion provided with a deflector, and driving devices for revolving the said end portion, substantially as set forth.

8. In a pneumatic straw stacker, the combination, with a discharge pipe, of a revoluble end portion provided with a deflector, an operating shaft journaled parallel with the said pipe, and driving mechanism operatively connecting the said shaft and end portion, substantially as set forth.

9. In a pneumatic straw stacker, the combination, with a discharge pipe, of a revoluble end portion provided with a deflector, an operating shaft journaled parallel with the said pipe, a chain wheel secured to the said end portion, a chain pinion secured to the said shaft, and a drive chain connecting the said wheel and pinion, substantially as set forth.

10. In a pneumatic straw stacker, the combination, with a discharge pipe formed in sections coupled together by a flexible joint; of a revoluble end portion provided with a deflector, the shafts journaled parallel with the said pipe sections and operatively connected together at a point opposite to the said joint, and driving mechanism operatively connecting the upper shaft with the said end portion, substantially as set forth.

11. In a pneumatic straw stacker, the combination, with a discharge pipe formed in sections coupled together by a flexible joint; of a revoluble end portion provided with a deflector, a beveled toothed wheel journaled on a pin arranged opposite the said joint, the shafts journaled parallel with the said pipe sections, the beveled toothed pinions secured on the ends of the said shafts and gearing into the said wheel, and driving mechanism operatively connecting the upper shaft with the said end portion, substantially as set forth.

In testimony whereof I affix my signature in presence of two witnesses.

FRANK F. LANDIS.

Witnesses:
ALF. N. RUSSELL,
CAL. KROME.